(12) United States Patent
Marolia et al.

(10) Patent No.: US 12,229,069 B2
(45) Date of Patent: Feb. 18, 2025

(54) ACCELERATOR CONTROLLER HUB

(71) Applicant: Intel Corporation, Santa Clara, CA (US)

(72) Inventors: Pratik Marolia, Hillsboro, OR (US);
Andrew Herdrich, Hillsboro, OR (US);
Rajesh Sankaran, Portland, OR (US);
Rahul Pal, Bangalore (IN); David Puffer, Tempe, AZ (US); Sayantan Sur, Portland, OR (US); Ajaya Durg, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 940 days.

(21) Appl. No.: 17/083,200

(22) Filed: Oct. 28, 2020

(65) Prior Publication Data

US 2021/0042254 A1 Feb. 11, 2021

(51) Int. Cl.
*G06F 13/40* (2006.01)
*G06F 13/42* (2006.01)

(52) U.S. Cl.
CPC ...... *G06F 13/4027* (2013.01); *G06F 13/4221* (2013.01); *G06F 2213/0026* (2013.01)

(58) Field of Classification Search
CPC .............................................. G06F 2213/0026
See application file for complete search history.

(56) References Cited

U.S. PATENT DOCUMENTS

| | | | |
|---|---|---|---|
| 7,362,772 B1 * | 4/2008 | Alfieri | H04L 45/00 712/228 |
| 9,658,981 B2 | 5/2017 | Rossetti | |
| 10,579,557 B2 * | 3/2020 | Jayasena | G06F 15/7867 |
| 2004/0114589 A1 * | 6/2004 | Alfieri | H04L 63/0428 370/389 |
| 2019/0297015 A1 | 9/2019 | Marolia et al. | |
| 2020/0210233 A1 * | 7/2020 | Chen | G06N 3/08 |
| 2020/0210365 A1 * | 7/2020 | Wilkinson | G06F 9/30145 |
| 2021/0021619 A1 * | 1/2021 | Smith | H04L 63/145 |
| 2021/0026687 A1 * | 1/2021 | Miller | G06F 9/5038 |

(Continued)

OTHER PUBLICATIONS

Dutch Examination Report for Patent Application No. 2029100, Mailed Jun. 21, 2022, 10 pages.

*Primary Examiner* — Henry Tsai
*Assistant Examiner* — Aurangzeb Hassan
(74) *Attorney, Agent, or Firm* — Compass IP Law PC (57) ABSTRACT

Methods and apparatus for an accelerator controller hub (ACH). The ACH may be a stand-alone component or integrated on-die or on package in an accelerator such as a GPU. The ACH may include a host device link (HDL) interface, one or more Peripheral Component Interconnect Express (PCIe) interfaces, one or more high performance accelerator link (HPAL) interfaces, and a router, operatively coupled to each of the HDL interface, the one or more PCIe interfaces, and the one or more HPAL interfaces. The HDL interface is configured to be coupled to a host CPU via an HDL link and the one or more HPAL interfaces are configured to be coupled to one or more HPALs that are used to access high performance accelerator fabrics (HPAFs) such as NVlink fabrics and CCIX (Cache Coherent Interconnect for Accelerators) fabrics. Platforms including ACHs or accelerators with integrated ACHs support RDMA transfers using RDMA semantics to enable transfers between accelerator memory on initiators and targets without CPU involvement.

15 Claims, 9 Drawing Sheets

(56) References Cited

U.S. PATENT DOCUMENTS

2021/0194793 A1\* 6/2021 Huse .................. H04L 12/5602
2022/0012621 A1\* 1/2022 Gesek .................. G06N 10/00

\* cited by examiner

ACCELERATOR CONTROLLER HUB

BACKGROUND INFORMATION

In recent years, Graphics Processing Units (GPUs) have seen dramatic growth as parallel programmable accelerators. While many GPUs were originally intended to be used to accelerate graphics performance, such as for video games, the internal architecture of GPUs make them well suited for use in machine learning (ML) and artificial intelligence (AI) deployments. When used for ML and AI, the GPU may be thought of as a General-Purpose GPU (GPGPU). As used herein, GPUs, GPGPU and other parallel programmable accelerator devices are termed XPUs.

In high performance accelerated systems, the Host-Device Link (HDL) is becoming the bottleneck. The following are three examples illustrating this problem.

Network data ingestion: Growing compute needs driven by larger AI models or HPC (high-performance computing) workloads sometimes require splitting the problem across XPUs in two or more server nodes, connected using a high-speed network (like InfiniBand or Ethernet). The network interface cards (NICs) are connected to the host CPU (central processing unit) over a Host-Device Fabric (HDF). Therefore, all network dataflows are limited by the XPU HDL bandwidth.

Storage data ingestion: Storage drives are connected to the host CPU over an HDF. While advances like direct RDMA (Remote Direct Memory Access) from SSD (solid-state drive) to XPU memory prevents extra data copy in host memory, the effective bandwidth is still limited by the XPU HDL bandwidth.

Model sizes are growing faster than device memory capacity (like high-bandwidth memory (HBM) capacity). Advanced XPU memory virtualization methods (such as Unified Shared Memory schemes) enables application transparent device memory oversubscription and auto-migration. When the XPU's active working set does not fit within the device memory, then part of data overflows to host memory (like DRAM (dynamic random-access memory), or non-volatile memory), essentially using host memory as an overflow buffer. This is wasteful use of HDL bandwidth and CPU's memory controller bandwidth. This could have a negative impact on CPU thread's performance competing for memory bandwidth.

In all three cases XPU HDL bandwidth becomes a bottleneck. While the host CPU happens to be on the data path, it does not consume the data, nor does it add any value.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of methods and apparatus for an accelerator controller hub are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of this disclosure, an accelerator controller hub (ACH) is provided. The ACH represents a platform design rethinking based on the observation that moving storage, memory and networking closer to XPUs by connecting them to a high-performance accelerator fabric may yield a better platform balance and enable direct data movement to/from the data consumer/producer (either CPU or XPU).

Figure 1:
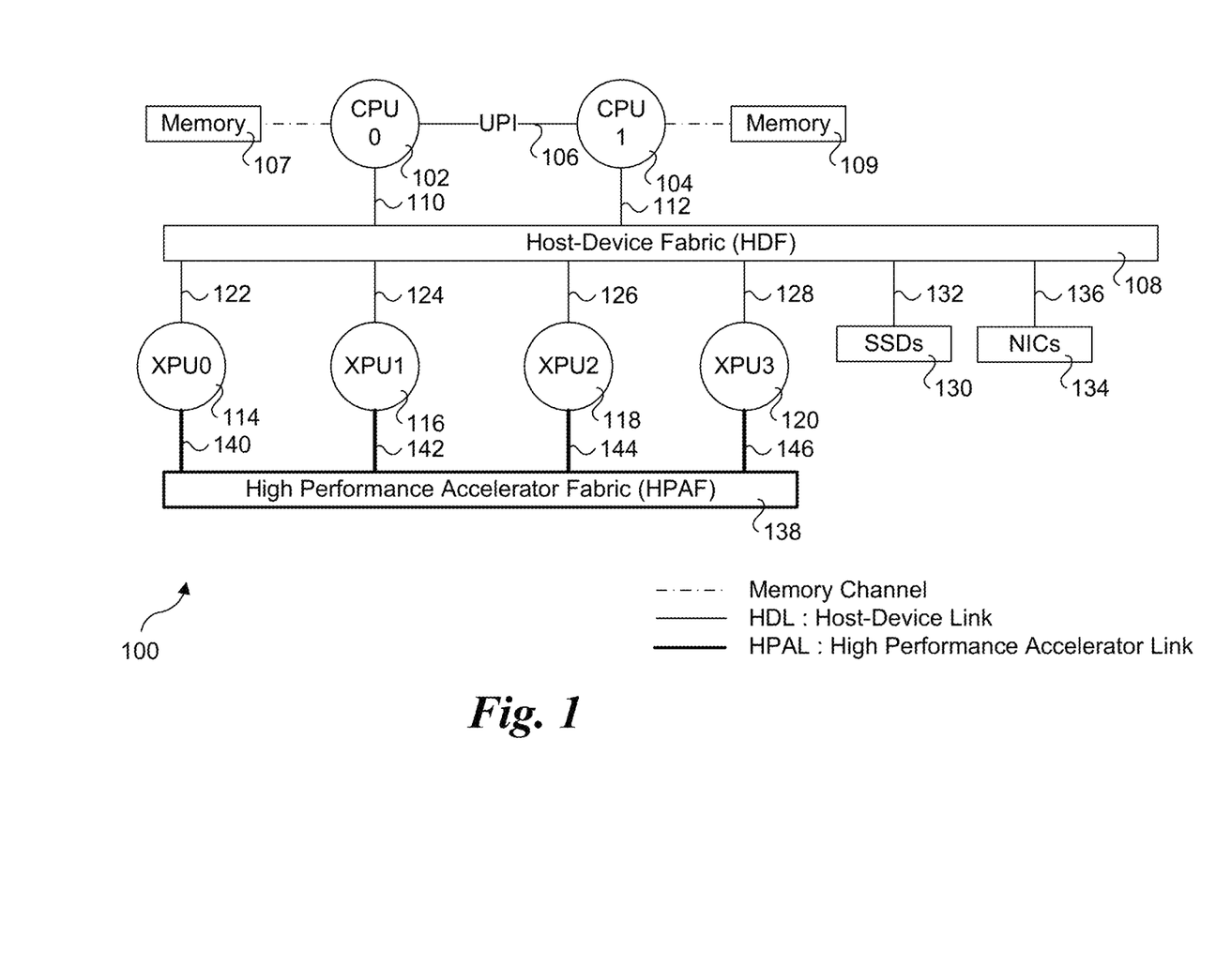
FIG. 1 is a schematic diagram of a multi-socket platform employing a current design including a pair of CPUs and multiple XPUs and IO devices, wherein the multiple XPUs and IO devices are coupled to the CPUs via a host device fabric (HDF) and the XPUs are coupled to one another via a high-performance accelerator fabric (HPAF)

FIG. 1 shows a platform 100 illustrating a current platform design. Platform 100 is a multi-socket platform including two CPUs 102 and 104 that are connected via an ultra-path socket-to-socket interconnect 106. CPU 102 is connected to host memory 107 comprising one or more memory devices, such as but not limited to DRAM DIMMs (dual inline memory modules) via one or more memory channels. Similarly, CPU 104 is connected to host memory 109 comprising one or more memory devices via one or more memory channels. Each of CPUs 102 and 104 is connected to a host-device fabric 108 via respective HDLs 110 and 112. HDF 108 is coupled to XPUs 114, 116, 118, and 120 via respective HDLs 122, 124, 126, and 128. HDF 108 is also connected to one or more SSDs 130 via one or more HDLs 132 and is connected to one or more NICs 134 via one or more HDLs 136. XPUs 114, 116, 118, and 120 are connected to a high-performance accelerator fabric (HPAF) 138 via respective high-performance accelerator links (HPALs) 140, 142, 144, and 146. Non-limiting examples of HPAFs include NVLink and CCIX (Cache Coherent Interconnect for Accelerators).

Under platform 100, input-output (TO) devices (e.g., SSDs 130 and NICs 134) are connected to HDF 108 only. XPU to IO flows traverse the HDF, either via a switch or through the CPU as discussed below.

Figure 2:
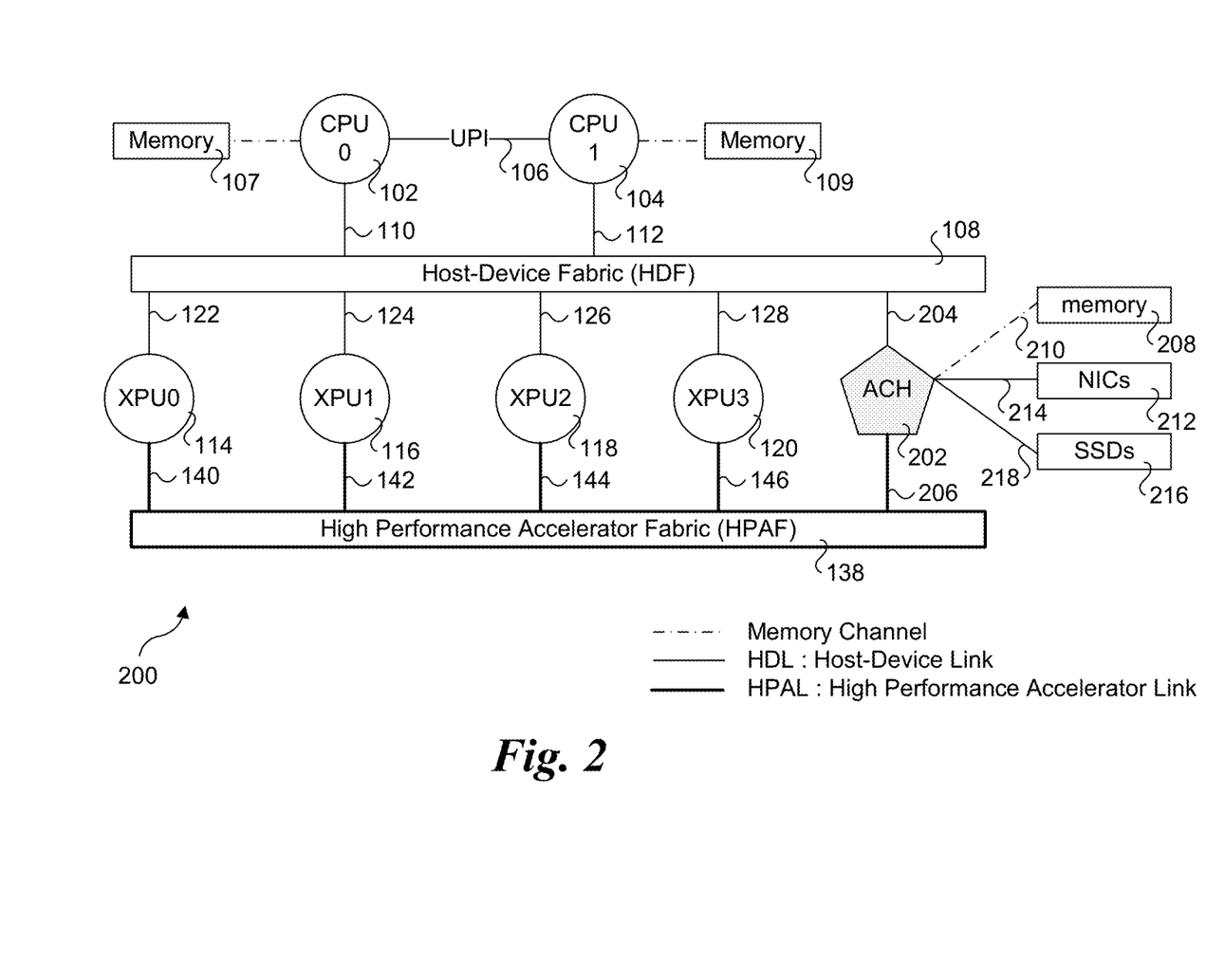
FIG. 2 is a schematic diagram of a multi-socket platform representing an augmented version of the multi-socket platform of FIG. 1 employing an accelerator controller hub (ACH) coupled between the HDF and the HPAF and to which multiple IO devices and memory are coupled, according to one embodiment.

FIG. 2 shows a platform 200 illustrating an example of a platform with an accelerator controller hub, according to one embodiment. Components in platforms 100 and 200 in FIGS. 1 and 2 with like-numbered references have similar configurations in both platforms. Accordingly, the following focuses on the differences between platforms 100 and 200.

Under platform 200, an ACH 202 is coupled to HDF 108 via an HDL 204 and to HPAF 138 via an HPAL 206. Memory 208 comprising one or more memory device is coupled to ACH 202 via one or more memory channels 210. As an option, memory 208 may comprise storage-class memory, such as a hybrid memory, that is connected to ACH 204 via an HDL such as a PCIe (Peripheral Component Interconnect Express) link.

One or more NICs 212 are connected to ACH 202 via one or more HDLs 214. Similarly, one or more SSDs 216 are connected to ACH 202 via one or more HDLs 218. Generally, NICs 212 and SSDs 216 are illustrative of IO devices that may be coupled to an ACH. Such IO devices further include but are not limited to network interfaces, InfiniBand HCAs, offloaded accelerator, encryption, and security devices, and FPGAs.

Figure 3:
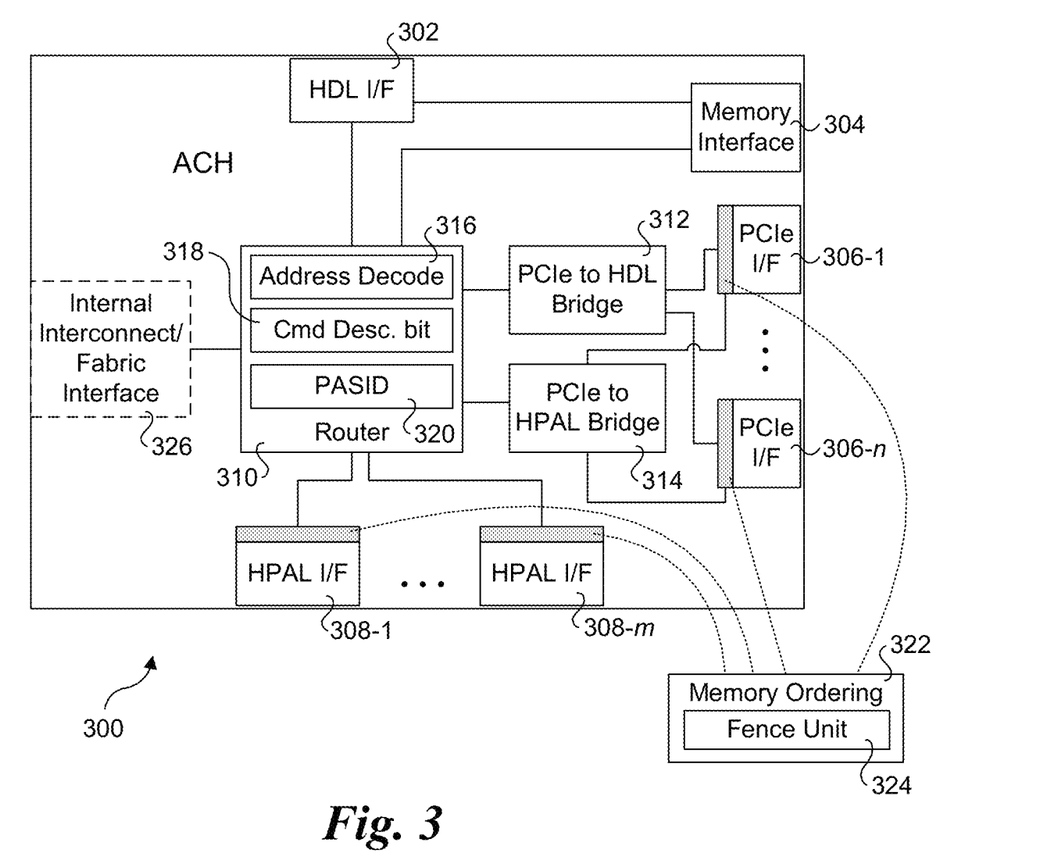
FIG. 3 is a schematic diagram of an ACH, according to one embodiment.

FIG. 3 shows further details of an ACH 300, according to one embodiment. The interfaces for ACH 300 include an HDL interface (I/F) 302, a memory interface 304, one or more (n) PCIe interfaces 306-1 . . . 306-n, and one or more (m) HPAL interfaces 308-1 . . . 308-m. ACH 300 further includes provisions for routing and protocol bridging, including a router 310, a PCIe to HDL bridge 312, and a PCIe to HPAL bridge 314.

HDL interface 302 is used for device discovery, enumeration, and host communication. An HDL interface is also used to maintain software compatibility. The one or more PCIe interfaces are used to connect to PCIe IO devices like NICs and SSDs via respective PCIe links. The one or more HPAF interfaces provide direct data paths from and IO device or memory to an HPAF attached accelerators, such as XPUs shown in FIG. 2. Memory interface 304 is used to connect to various types of memory devices such as DRAM DIMMs, non-volatile DIMMs (NVDIMMs), and hybrid DIMMs that combine both volatile and non-volatile memory.

PCIe to HDL bridge 312 provides bridging functionality between the PCIe interfaces 306-1 . . . 306-n and HDL interface 302 to enable the host to enumerate and communicate with the PCIe IO devices coupled to the PCIe interfaces. If an HDL is a PCIe link, then this implies that the ACH should further implement PCIe switch functionality (not shown). For traffic directed towards the accelerators via HPF, ACH 300 uses PCIe to HPAL bridge 314 to bridge between the PCIe and HPAL protocols. This may involve remapping the opcodes, reformatting the packets, breakdown the payload etc.

Router 310 is configured to steer memory requests targeting CPU host memory over HDL, while flows targeting XPU memory will be directed over HPAL. The routing decision may be based on one or more of the following:
  a. Address decode—A simple physical address decode (base/limit registers like PCIe) may be sufficient for implementations employing physical addresses. The logic for performing this is depicted by address decode logic 316.
  b. A bit in command descriptor—This enables SW to specify the target in a command descriptor, as depicted by a command descriptor bit 318.
  c. Process Address Space Identifier (PASID)—for future scalable IOV (input-output virtualization) devices, one could use a separate IO device queue per memory target. PASID logic 320 is used to decode the queue id to route the request.

An ACH may also have to bridge the memory ordering model. For example, most PCIe devices follow a strong ordered producer-consumer model. Many HPAFs use weakly ordered memory semantics (e.g., XeMemFabric is weakly ordered). In the illustrated embodiment, PCIe interfaces 306-1 . . . 306-n and HPAL interfaces 308-1 . . . 308-m include a memory ordering block 322. In one embodiment, memory ordering block 322 implements a fence unit 324 to drain prior writes targeted to an XPU upon a trigger. The following are some examples of a trigger:
  a. Zero Length Read operation.
  b. RO=0 write will flush prior writes targeted to HPAL
  c. Software triggered fence—an ACH aware application could use an explicit trigger to ensure data generated by an IO device is observable before launching a dependence XPU kernel.

When ACH 300 is integrated in an accelerator die or is on package with an accelerator, it further includes an internal interconnect or fabric interface 326. Various types of interconnects or fabrics may be used, depending on the accelerator architecture and associated internal interface on the accelerator.

Figure 4A:
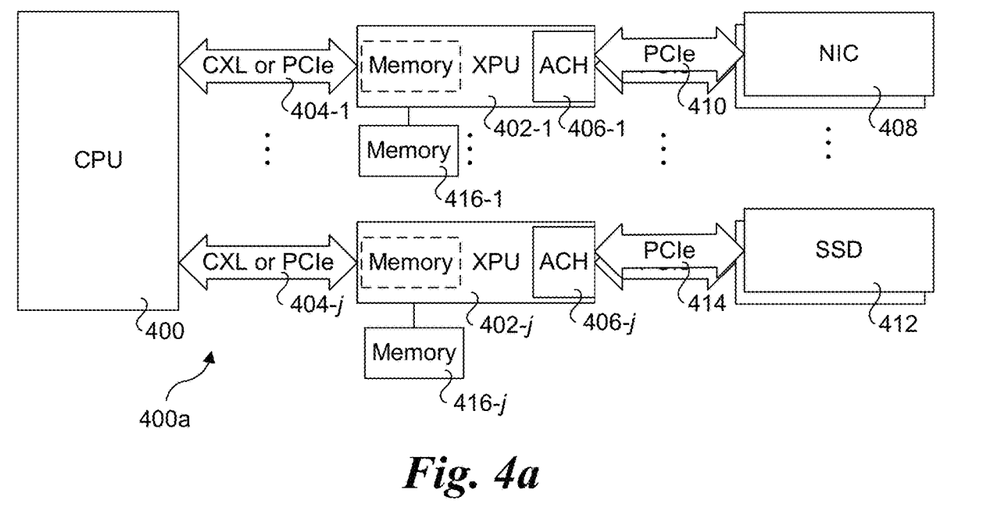
FIG. 4a is a schematic diagram of a system including a CPU coupled to multiple XPUs with integrated ACHs to which IO devices are coupled.
Figure 4B:
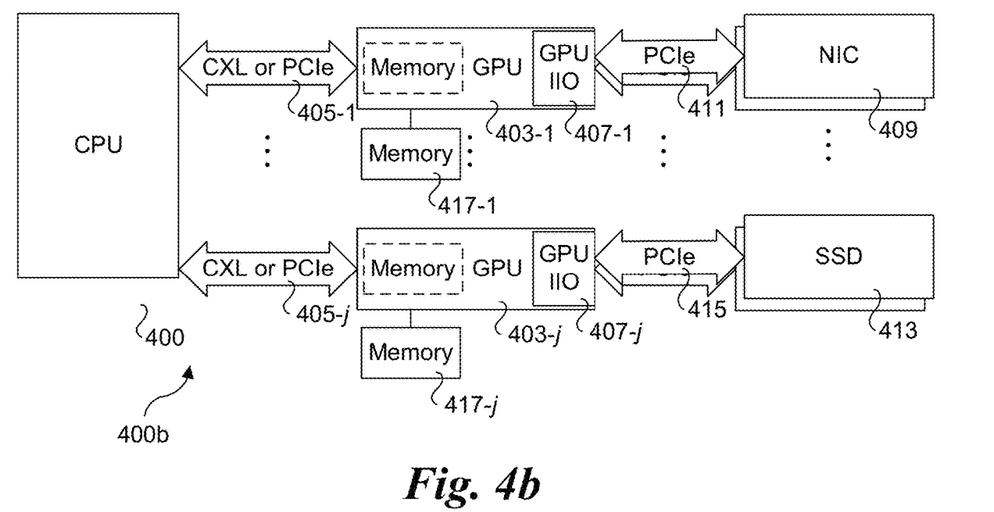
FIG. 4b is a schematic diagram of a system including a CPU coupled to multiple GPUs with integrated GPU-IIOs to which IO devices are coupled.

FIGS. 4a and 4b respectively show platforms 400a and 400b with accelerators include on-die or on package ACH's. As shown in FIG. 4a, platform 400a includes a CPU 400 coupled to multiple (j) XPUs 402-1 . . . 402-j via respective Compute Express Link (CXL) or PCIe links 404-1 . . . 404-j. Each of XPUs 402-1 . . . 402-j includes a respective on-die or on package ACHs 406-1 ... 406-j. XPU 402-1 is coupled to one or more NICs 408 via one or more PCIe links 410 connected to PCIe interfaces on ACH 406-1. Similarly, XPU 402-j is coupled to one or more SSDs 412 via one or more PCIe links 414 connected to PCIe interfaces on ACH 406-j.

Generally, an accelerate may include embedded memory or may including a memory interface coupled to external memory, observing that some implementations may not include either of these memories. The memory is referred to as accelerator memory. In platform 400a, each XPU is coupled to accelerator memory, as depicted by accelerator memory 416-1 ... 416-j. As depicted by the dashed box labeled 'Memory' on the XPUs, the accelerator memory may be embedded on the XPU.

Under the embodiment of platform 400b, the accelerators are GPUs and the ACHs are GPU integrated IO interfaces (ITO). As shown in FIG. 4b, platform 400b includes a CPU 400 coupled to multiple (j) GPUs 403-1 ... 403-j via respective CXL or PCIe links 405-1 ... 405-j. GPUs 403-1 ... 403-j include respective on-die or on package GPU IIOs 407-1 ... 406-j. GPU 403-1 is coupled to one or more NICs 409 via one or more PCIe links 411 connected to PCIe interfaces on GPU IIO 407-1. Similarly, GPU 403-j is coupled to one or more SSDs 413 via one or more PCIe links 415 connected to PCIe interfaces on ACH 407-j. GPUs 403-1 ... 403-j further are shown as coupled to GPU memory 417-1 ... 417-j. As before, the GPU memory may be embedded on a GPU rather than external to the GPU. Moreover, in some embodiments a GPU includes a embedded GPU memory and also is coupled to external GPU memory.

Figure 5:
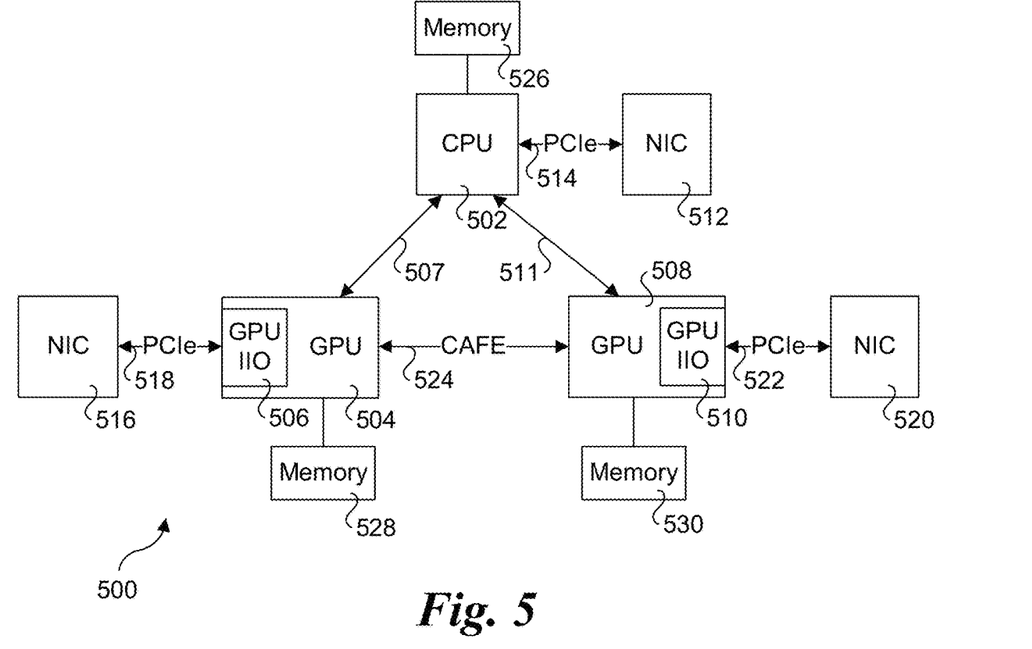
FIG. 5 is a schematic diagram of a system including a CPU coupled to a pair of GPUs with integrated GPU IIOs interconnected via a CAFE link, according to one embodiment.

FIG. 5 shows a platform 500 implementing a new CAFE inter-accelerator link based on CXL being designed for a next generation GPU and comprising an HPAF. As shown, platform 500 includes a CPU 502 coupled to a GPU 504 including a GPU IIO 506 via a CXL or PCIe link 507 and CPU 502 is coupled to a GPU 508 including a GPU IIO 510 via a CXL or PCIe link 511. CPU 502 is further coupled to a NIC 512 via a PCIe link 514. GPU IIO 506 on GPU 504 is coupled to a NIC 516 via a PCIe link 518. Similarly, GPU IIO 510 on GPU 508 is coupled to a NIC 520 via a PCIe link 522. GPUs 504 and 508 are connected via a CAFÉ inter-accelerator link 524. CPU 502 is further coupled to memory 526, while GPU 504 is coupled to memory 528 and GPU 508 is coupled to memory 530.

In platform 500, NICs 516 and 520 are direct-attached to GPUs 504 and 508. Alternatively or in addition, storage devices such as SSDs and storage class memory may be direct-attached to GPUs. The direct attachment enables low-latency and high-bandwidth communication and access to local large ML training sets without the involvement of the host CPU. With 15 TB+ SSDs available now, and more on the roadmap, caching large training sets close to the GPU will unlock massive AI training performance potential.

Figure 6:
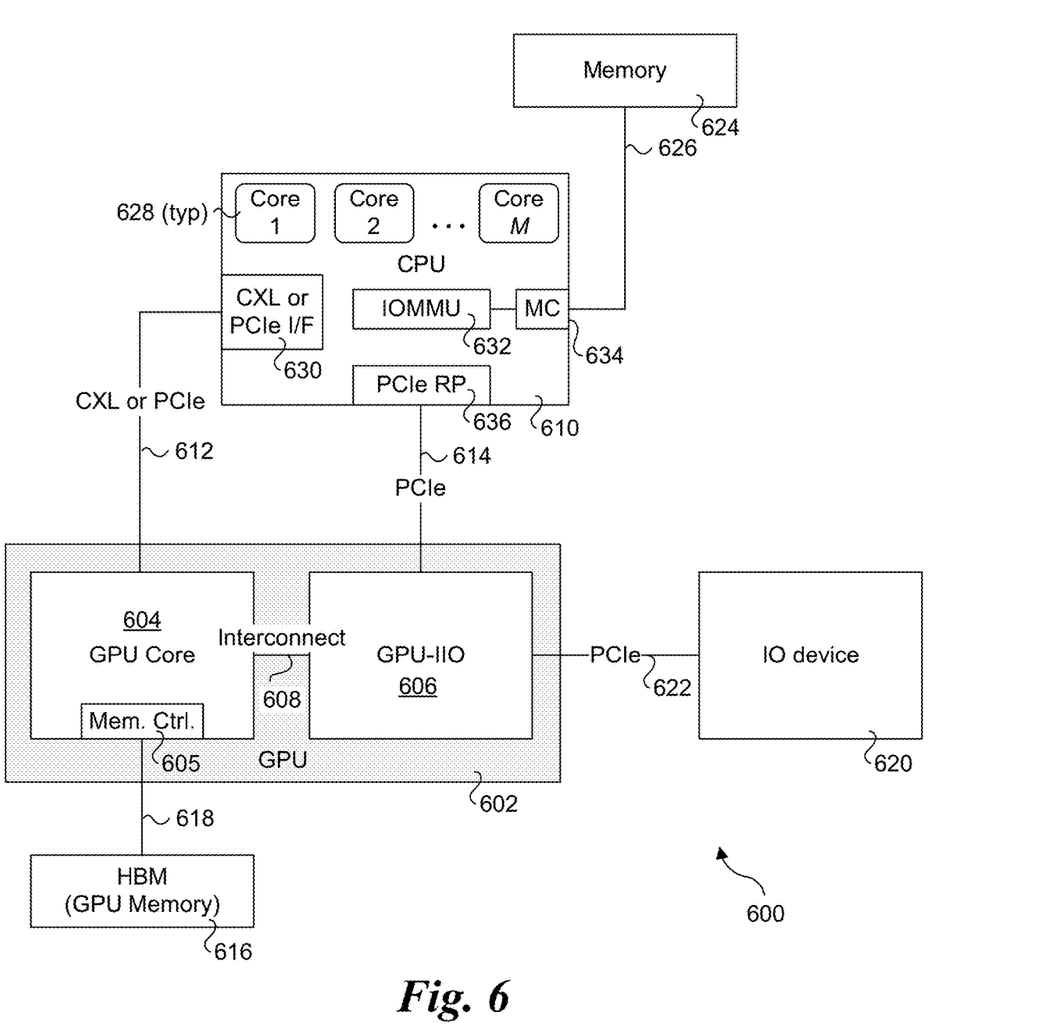
FIG. 6 is a schematic diagram of a platform including a GPU with an on-die or on package GPU IIO that is coupled to a CPU and an IO device, according to one embodiment.

FIG. 6 shows platform 600 including a GPU with an on-die or on package GPU IIO that is coupled to a CPU and an IO device, according to one embodiment. Platform 600 includes a GPU 602 including a GPU Core 604 internally coupled to an on-die or on package GPU-IIO 606 via an interconnect 608. The GPU core represents the parallel processing circuitry implemented by a GPU to perform graphics processing operations and/or accelerator operations (e.g., matrix operations used in ML and AI). A CPU 610 is connected to GPU core 604 via a CXL or PCIe link 612 and is connected to GPU-IIO 606 via a PCIe link 614. GPU core 604 is also connected to GPU memory comprising high-bandwidth memory (HBM) 616 via link 618, while GPU-IIO is connected to an IO device 620 via a PCIe link 622. CPU 610 is also connected to one or more memory devices 624 via one or more memory channels 610. IO device 620 is more generally representative of any PCIe-compliant device that may be attached to the ACH, enabling tremendous flexibility in the NICs, SSDs, or other IO devices used, and in attaching nearby data coprocessors, for instance.

As further show, CPU 610 includes M cores 628, a CXL or PCIe interface 630, an input-output memory management unit (IOMMU) 632, a memory controller (MC) 634, and a PCIe root port (RP) 636. In some embodiments, an IOMMU is integrated in a memory controller. Core 628 are used to execute software that has been loaded into memory 624, as well as platform firmware (not shown). CXL or PCIe link 612 is coupled to CXL or PCIe interface 630. When CXL or PCIe link 612 is a PCIe link, CXL or PCIe interface 630 may be a PCIe RP. PCIe link 614 is coupled to PCIe RP 636, which is embedded in or coupled to a PCIe root complex (not shown).

As is known, an IOMMU is used to support DMA transfers by (among other functions) mapping memory addresses in IO devices and host memory. A DMA transfer is performed without involvement of any of cores 628. Other DMA transfers described an illustrated herein may include additional IOMMUs that are not shown and/or other components to facilitate the DMA transfers, such as a translation look-aside buffer (TLB). For example, GPU 602 may include an IOMMU and/or a TLB to support DMA data transfers between HBM 616 and IO device 620. In some embodiments, one or more TLBs are implement in an IOMMU.

The more flexible mapping of NICs 1:1 (or in similar a larger ratio) with GPUs will enable significant distributed training performance gains. Moreover, with ACH flows, the host (CPU) may still access, use, virtualize and share the downstream PCIe device. This means that an investment in high-performance SSDs or NICs may be shared with both the host or hosted VMs on a server-class CPU, which will provide a cost benefit to Cloud service providers and the like.

RDMA-based NICs as these are key for low-latency, and tend to be optimized for high throughput. A specific example of RDMA flows is shown below, encompassing both send and receive details. Here "RNIC" is used to refer to an RDMA-enabled NIC, and this can be abstracted to use Verbs/UCX/OFI semantics.

Figure 7A:
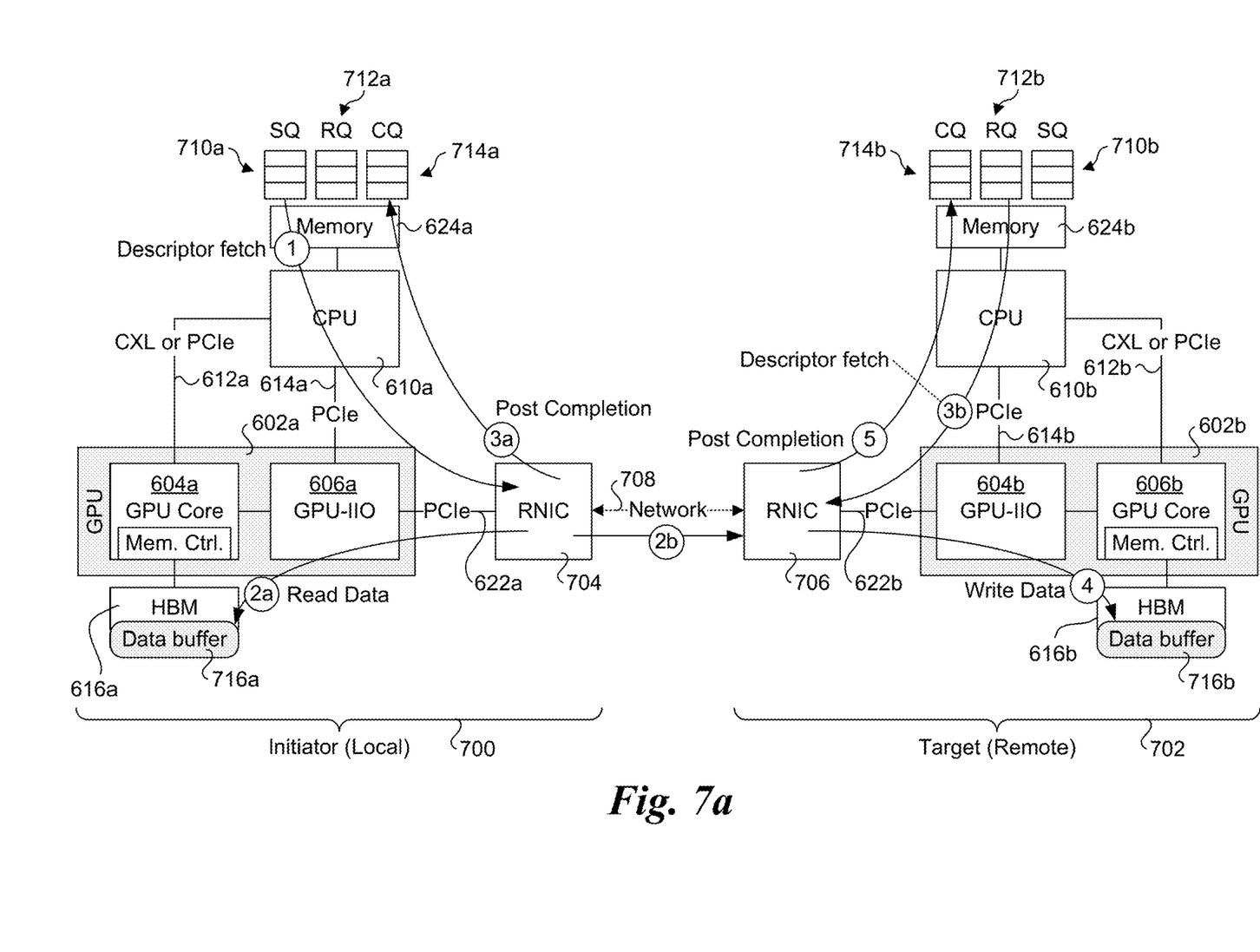
FIG. 7a is a schematic diagram of a system including an initiator and a target, further illustrating a remote direct memory access (RDMA) Send flow under which data is sent from the initiator and written to GPU memory on the target, according to one embodiment.
Figure 7B:
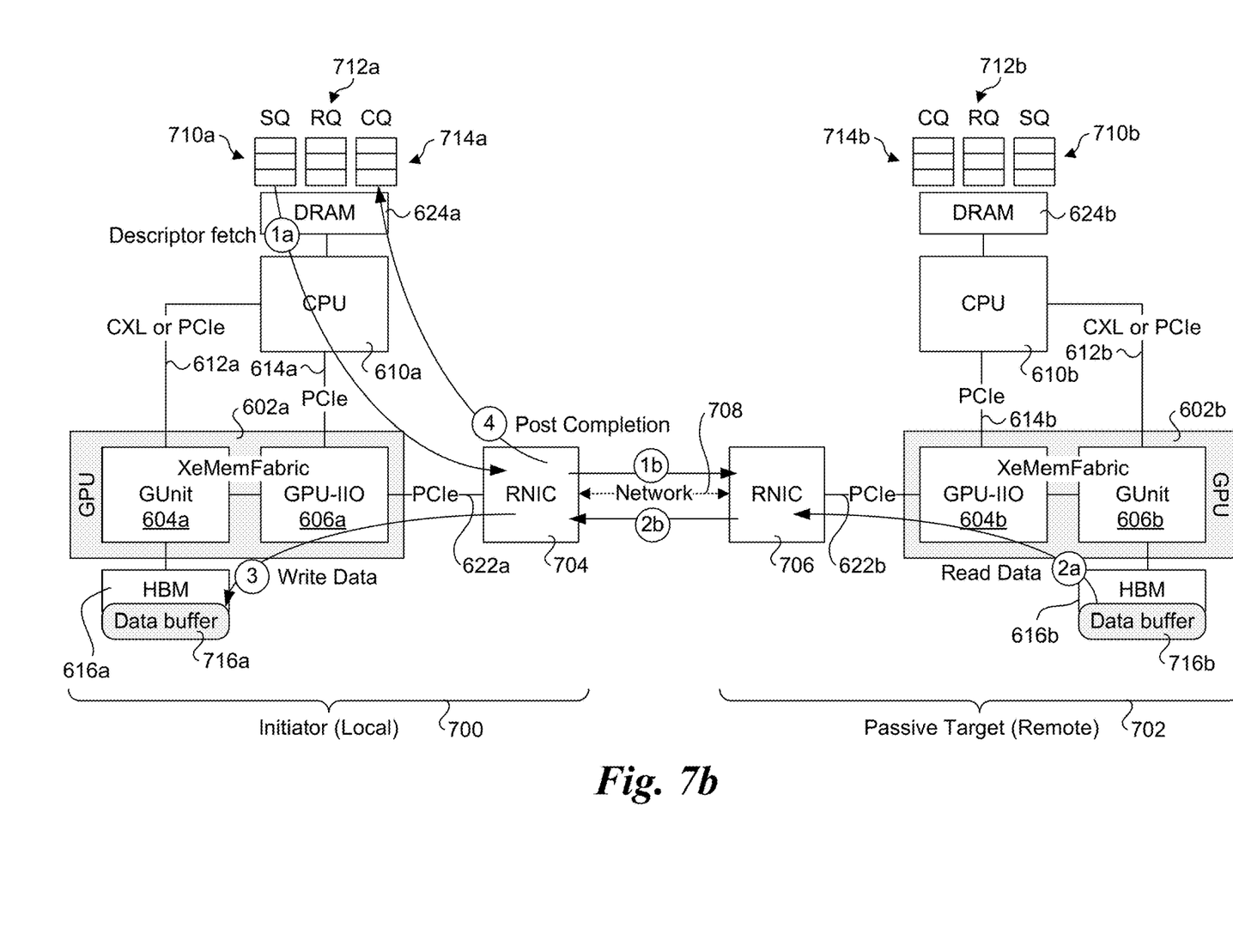
FIG. 7b is a schematic diagram of the system of FIG. 7a where the target is a passive target, further illustrating an RDMA Read flow under which data is read from the GPU memory of the passive target and written to the GPU memory of the initiator, according to one embodiment.

FIGS. 7a and 7b show an embodiment of a system comprising a pair of platforms 700 and 702 that are configured to communication using RDMA flows. Platforms 700 and 702 have similar configurations to platform 600 of FIG. 6 discussed above, where like-numbered components (used for platform 600) for platform 700 include an appended 'a' and for platform 702 include an appended 'b'. For example, platform 700 includes a GPU 602a while platform 702 includes a GPU 602b, wherein both GPU 602a and 602b have a similar configuration to GPU 602 in platform 600.

Platform 700 includes an RNIC 704 coupled to GPU-IIO 606a via a PCIe link 622a. Similarly, platform 702 includes an RNIC 706 coupled to GPU-IIO 606b via a PCIe link 622b. RNIC 704 is connected to RNIC 706 via a network 708. Generally, network 708 may be a network that using a protocol for which RNICs are available, including but not limited to Ethernet networks and InfiniBand networks. For Ethernet implementation, RDMA over converged Ethernet (RoCE) protocols may be used (e.g, RoCE V1 or RoCE V2).

Platforms 700 and 702 respectively include send queues (SQs) 710a and 710b, receive queues (RQs) 712a and 712b, and completion queues (CQs) 714a and 714b, which are implemented in memory 624a and memory 624b. HBM 616a on platform 700 includes a data buffer 716a, while HBM 616b on platform 702 includes a data buffer 716b.

FIG. 7a illustrates an example of an RDMA Send/Receive flow, while FIG. 7b illustrates and example of a RDMA Read flow. In FIG. 7a, platform 700 is the initiator, while platform 702 is the target. In FIG. 7b, platform 700 is the initiator while platform 702 is a passive target.

From the perspective of a GPU, an RDMA Send operation allows a local host (i.e., initiator) to send data to an RQ in a remote host (the target). Per RDMA standards, the receiver will have previously posted a receive buffer to receive the data into the RQ. The sender does not have control over where the data will reside in the remote host. This is called a two-sided operation, because the remote host participates in the operation, by posting the Work Queue Entry (WQE) in the RQ.

For the following discussion, assume a user has queued the RDMA Send and Receive WQE to respective Send Queue (SQ) and Receive Queue (RQ). The set of operations involved in performing an RDMA Send are listed below, with the associated operations being shown as single-ended arrows with encircle numbers representing the operations.

During a first operation (1), RNIC 704 at the initiator (sender) fetches the descriptor (or WQE) from SQ 704a. RNIC 704 then uses to the descriptor or WQE to read the data from the local GPU memory (data buffer 716a in HBM 616a) during operation 2a and sends the read data over network 708 to the target RNIC 706 during operation 2b.

While operation 3 is ordered with respect to operations 2a and 2b, there is no specific ordering for operations 3a and 3b. During operation 3a, after all data is sent by the initiator, RNIC 704 may post a completion to CQ 714a. In operation 3b, upon receiving a send operation, RNIC 706 at the target fetches a descriptor from RQ 712b. In operation 4, RNIC 706 performs an access permission check, and writes received data to the address specified by the RQ descriptor in data buffer 716b of HBM 616b. After all data is written, RNIC 706 posts a completion to CQ 714b, as depicted by operation 5.

FIG. 7b shows an RDMA Read flow, under which data is read from the remote host (depicted as the passive target). The initiator specifies the remote virtual address as well as local memory address to be copied to. The remote target is passive because the remote host does not participate the operation (i.e., CPU 610b is not involved). Rather remote RNIC 706 performs a DMA write to the specified remote virtual address.

For the purposes of this discussion assume the user has queued the RDMA READ WQE to SQ 710a. Operations for performing an RDMA Read are as follows. During first operations 1a and 1b, RNIC 704 at the initiator fetches the descriptor (or WQE) from SQ 710a and sends the request over to the RNIC 706 at the target. During second operations 2a and 2b RNIC 706 performs access permission checks for the remote address, fetches the data from GPU memory (data buffer 716b in HBM 616b) and returns it back to the initiator RNIC 704. RNIC 704 then writes the data to the GPU memory (data buffer 716a in HBM 616a), as depicted by operation 3. After the full buffer is read, RNIC 704 posts a completion to CQ 714a, as depicted by operation 4.

Similar flows are possible with SSDs and other PCIe devices, and common to these flows is the ability for the GPU-IIO (ACH) to route and manage traffic from the downstream PCIe device (RNIC in this example) and determine which flows should to/from host memory on the host processor, vs. which flows are destined for a GPU. For instance, this is performed by the GPU core in the RDMA Send and RDMA Read flow examples, and often on to GPU high-bandwidth memory. In this fashion the ACH may be thought of as a complex and integral component to enable this system architecture.

In the example of FIGS. 7a and 7b, the RDMA flow is a host-mastered flow (where the descriptor submission is from the CPU). In another embodiment, the ACH can also allow an XPU-mastered flow where the descriptor is submitted from a kernel running on the XPU itself.

Figure 8:
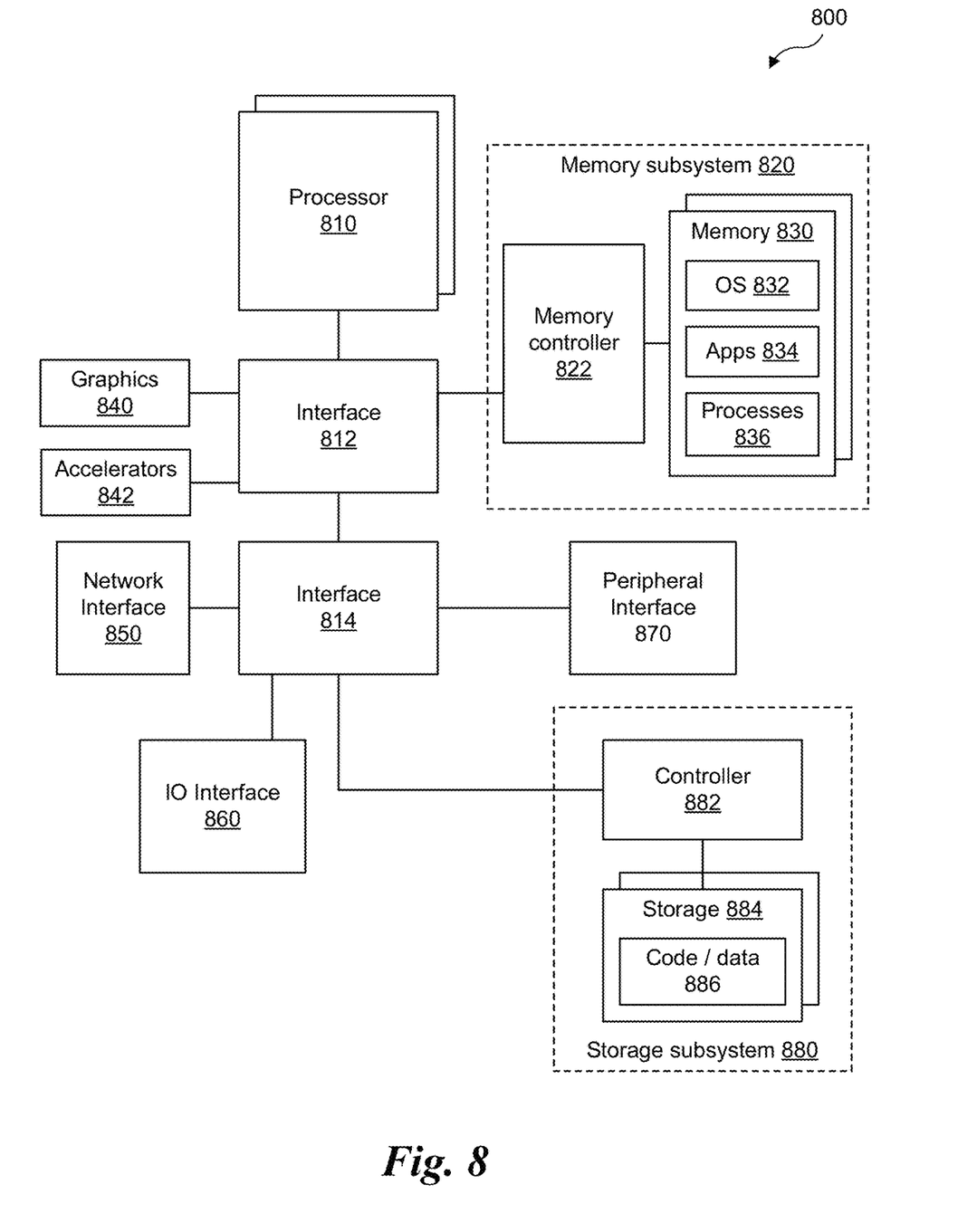
FIG. 8 is a diagram of a system that may be implemented with aspects of the embodiments described and illustrated herein.

FIG. 8 depicts a system 800 in which aspects of some embodiments disclosed above may be implemented. System 800 includes one or more processors 810, which provides processing, operation management, and execution of instructions for system 800. Processor 810 can include any type of microprocessor, central processing unit (CPU), graphics processing unit (GPU), processing core, multi-core processor or other processing hardware to provide processing for system 800, or a combination of processors. Processor 810 controls the overall operation of system 800, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 800 includes interface 812 coupled to processor 810, which can represent a higher speed interface or a high throughput interface for system components that needs higher bandwidth connections, such as memory subsystem 820 or optional graphics interface components 840, or optional accelerators 842. Interface 812 represents an interface circuit, which can be a standalone component or integrated onto a processor die. Where present, graphics interface 840 interfaces to graphics components for providing a visual display to a user of system 800. In one example, graphics interface 840 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 840 generates a display based on data stored in memory 830 or based on operations executed by processor 810 or both. In one example, graphics interface 840 generates a display based on data stored in memory 830 or based on operations executed by processor 810 or both.

In some embodiments, accelerators 842 can be a fixed function offload engine that can be accessed or used by a processor 810. For example, an accelerator among accelerators 842 can provide data compression capability, cryptography services such as public key encryption (PKE), cipher, hash/authentication capabilities, decryption, or other capabilities or services. In some embodiments, in addition or alternatively, an accelerator among accelerators 842 provides field select controller capabilities as described herein. In some cases, accelerators 842 can be integrated into a CPU socket (e.g., a connector to a motherboard or circuit board that includes a CPU and provides an electrical interface with the CPU). For example, accelerators 842 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 842 can provide multiple neural networks, CPUs, processor cores, general purpose graphics processing units, or graphics processing units can be made available for use by AI or ML models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 820 represents the main memory of system 800 and provides storage for code to be executed by processor 810, or data values to be used in executing a routine. Memory subsystem 820 can include one or more memory devices 830 such as read-only memory (ROM), flash memory, one or more varieties of random access memory (RAM) such as DRAM, or other memory devices, or a combination of such devices. Memory 830 stores and hosts, among other things, operating system (OS) 832 to provide a software platform for execution of instructions in system 800. Additionally, applications 834 can execute on the software platform of OS 832 from memory 830. Applications 834 represent programs that have their own operational logic to perform execution of one or more functions. Processes 836 represent agents or routines that provide auxiliary functions to OS 832 or one or more applications 834 or a combination. OS 832, applications 834, and processes 836 provide software logic to provide functions for system 800. In one example, memory subsystem 820 includes memory controller 822, which is a memory controller to generate and issue commands to memory 830. It will be understood that memory controller 822 could be a physical part of processor 810 or a physical part of interface 812. For example, memory controller 822 can be an integrated memory controller, integrated onto a circuit with processor 810.

While not specifically illustrated, it will be understood that system 800 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 800 includes interface 814, which can be coupled to interface 812. In one example, interface 814 represents an interface circuit, which can include standalone components and integrated circuitry. In one example, multiple user interface components or peripheral components, or both, couple to interface 814. Network interface 850 provides system 800 the ability to communicate with remote devices (e.g., servers or other computing devices) over one or more networks. Network interface 850 can include an Ethernet adapter, wireless interconnection components, cellular network interconnection components, USB (universal serial bus), or other wired or wireless standards-based or proprietary interfaces. Network interface 850 can transmit data to a device that is in the same data center or rack or a remote device, which can include sending data stored in memory. Network interface 850 can receive data from a remote device, which can include storing received data into memory. Various embodiments can be used in connection with network interface 850, processor 810, and memory subsystem 820.

In one example, system 800 includes one or more IO interface(s) 860. IO interface 860 can include one or more interface components through which a user interacts with system 800 (e.g., audio, alphanumeric, tactile/touch, or other interfacing). Peripheral interface 870 can include any hardware interface not specifically mentioned above. Peripherals refer generally to devices that connect dependently to system 800. A dependent connection is one where system 800 provides the software platform or hardware platform or both on which operation executes, and with which a user interacts.

In one example, system 800 includes storage subsystem 880 to store data in a nonvolatile manner. In one example, in certain system implementations, at least certain components of storage 880 can overlap with components of memory subsystem 820. Storage subsystem 880 includes storage device(s) 884, which can be or include any conventional medium for storing large amounts of data in a nonvolatile manner, such as one or more magnetic, solid state, or optical based disks, or a combination. Storage 884 holds code or instructions and data 886 in a persistent state (i.e., the value is retained despite interruption of power to system 800). Storage 884 can be generically considered to be a "memory," although memory 830 is typically the executing or operating memory to provide instructions to processor 810. Whereas storage 884 is nonvolatile, memory 830 can include volatile memory (i.e., the value or state of the data is indeterminate if power is interrupted to system 800). In one example, storage subsystem 880 includes controller 882 to interface with storage 884. In one example controller 882 is a physical part of interface 814 or processor 810 or can include circuits or logic in both processor 810 and interface 814.

A volatile memory is memory whose state (and therefore the data stored in it) is indeterminate if power is interrupted to the device. Dynamic volatile memory requires refreshing the data stored in the device to maintain state. One example of dynamic volatile memory includes DRAM, or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014), HBM (High Bandwidth Memory, JESD325, originally published by JEDEC in October 2013, LPDDR3 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 800. More specifically, power source typically interfaces to one or multiple power supplies in system 800 to provide power to the components of system 800. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 800 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), quick UDP Internet Connections (QUIC), RDMA over Converged Ethernet (RoCE), Peripheral Component Interconnect express (PCIe), Intel® QuickPath Interconnect (QPI), Intel® Ultra Path Interconnect (UPI), Intel® On-Chip System Fabric (IOSF), Omnipath, Compute Express Link (CXL), HyperTransport, Infinity Fabric, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Italicized letters, such as 'n', etc. in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. An integrated circuit comprising: a hub, including, a host device link (HDL) interface configured to connect the hub to a host via an HDL link coupled between the hub and the host; one or more input-output (IO) interfaces, configured to be connected to an IO device via a direct IO link between an IO interface and the IO device; one or more accelerator link interfaces, configured to be connected to an accelerator via a direct link between an accelerator link interface and the accelerator; a router, operatively coupled to each of the HDL interface, the one or more IO interfaces, and the one or more accelerator link interfaces, wherein the hub is configured to transfer data originating from one or more accelerators connected to the one or more accelerator link interfaces to one or more IO devices connected to the one or more IO interfaces.

2. The integrated circuit of claim 1, wherein the one or more IO interfaces comprise one or more Peripheral Component Interconnect Express (PCIe) interfaces, and wherein the hub further includes a PCIe to HDL bridge that is operatively coupled to the one or more PCIe interfaces and the router.

3. The integrated circuit of claim 1, wherein the one or more IO interfaces comprise one or more Peripheral Component Interconnect Express (PCIe) interfaces, and wherein the hub further includes a PCIe to accelerator link bridge that is operatively coupled to the one or more PCIe interfaces and the router.

4. The integrated circuit of claim 1, further comprising one or more memory ordering logic blocks, operatively coupled to or integrated in a respective IO interface or an accelerator link interface.

5. The integrated circuit of claim 4, wherein the memory ordering logic block includes a fence unit configured to drain prior writes targeted to an accelerator coupled to an accelerator link interface.

6. The integrated circuit of claim 1, further including a memory interface having one or more memory channels, coupled to at least one of the router and the HDL interface.

7. The integrated circuit of claim 1, further comprising an accelerator in which the hub is integrated.

8. The integrated circuit of claim 7, wherein the accelerator comprises a graphics processing unit GPU and the hub comprises a GPU integrated input output (GPU-IIO) block including at least two IO interfaces.

9. The integrated circuit of claim 8, wherein the GPU includes a GPU core coupled to the GPU IIO block and the GPU includes a memory interface configured to be coupled to one or more memory devices or includes embedded memory.

10. A system, comprising: a host central processing unit (CPU) including a memory controller; host memory, comprising one or more host memory devices coupled to the memory controller; an accelerator processing unit (XPU), coupled to the host CPU via at least one host device link (HDL) directly coupled between the XPU and the host CPU, including, a processing unit; and an integrated hub, coupled to the processing unit, the integrated hub having one or more input-output (IO) device interfaces and including a router; and one or more IO devices, directly coupled to respective IO device interfaces on the integrated hub via respective IO links, wherein the system is enabled to transfer data between the host memory and the one or more IO devices via the integrated hub using direct memory access (DMA) transfers.

11. The system of claim 10, further comprising accelerator memory, coupled to the accelerator or embedded on the accelerator, wherein the system is configured to transfer data between the accelerator memory and the host memory using DMA transfers and to transfer data between the one or more IO devices and the accelerator memory using DMA transfers.

12. The system of claim 11, wherein the XPU comprises a Graphics Processing Unit (GPU) including a GPU core coupled to a GPU integrated input-output block (GPU-IIO) comprising the integrated hub.

13. The system of claim 12, wherein the GPU core is coupled to the host CPU via a first HDL and the GPU-IIO is coupled to the host CPU via a second HDL.

14. The system of claim 12, further comprising one or more GPU memory devices, wherein the one or more GPU memory devices are coupled to the GPU core, and wherein the GPU is configured to transfer data between a GPU memory device and an IO device using direct memory access (DMA) transfers.

15. The system of claim 12, further comprising one or more GPU memory devices, wherein the one or more GPU memory devices are coupled to the GPU core, and wherein the system is configured to transfer data between a GPU memory device and a host memory device using direct memory access (DMA) transfers.

* * * * *